United States Patent [19]
Akahane

[11] Patent Number: 5,654,942
[45] Date of Patent: Aug. 5, 1997

[54] WIRELESS VOICE MESSAGING DEVICE FOR USE WITH CASSETTE PLAYER

[75] Inventor: Masaaki Akahane, Mahwah, N.J.

[73] Assignees: Sony Corporation, Tokyo, Japan; Sony Electronics Inc., Park Ridge, N.J.

[21] Appl. No.: 501,193

[22] Filed: Jul. 11, 1995

[51] Int. Cl.$^6$ .................................................. H04B 1/20
[52] U.S. Cl. .................................... 369/2; 340/825.44
[58] Field of Search ................................ 369/1, 2, 6, 7, 369/8, 10, 11; 340/825.44, 311.1; 455/38.1, 57.1, 38.2

[56] References Cited

U.S. PATENT DOCUMENTS

| | | | |
|---|---|---|---|
| 4,518,961 | 5/1985 | Davis et al. | 340/825.44 |
| 4,734,897 | 3/1988 | Schotz | 369/2 |
| 4,868,560 | 9/1989 | Oliwa et al. | 340/825.44 |
| 4,873,520 | 10/1989 | Fisch et al. | 340/825.44 |
| 4,885,577 | 12/1989 | Nelson | 340/825.44 |
| 4,965,569 | 10/1990 | Bennett et al. | 340/825.44 |
| 5,161,131 | 11/1992 | Borchardt et al. | 369/1 |
| 5,307,326 | 4/1994 | Osawa | 369/2 |
| 5,390,362 | 2/1995 | Modjeska et al. | 455/38.1 |
| 5,412,719 | 5/1995 | Hamamoto et al. | 380/9 |
| 5,444,675 | 8/1995 | De Bie et al. | 369/2 |

Primary Examiner—Tan Dinh
Attorney, Agent, or Firm—Peter C. Toto; Jerry A. Miller; Pasquale Musacchio

[57] ABSTRACT

A wireless voice messaging device including a cassette-shaped body adapted to be inserted into a cassette player in lieu of a cassette. A receiver for receiving incoming call signals including at least one incoming voice message, a memory for storing the incoming voice message and recalling the incoming voice message in response to a first control signal, and a transducer for establishing an operative connection with a play head of the cassette player for transferring the incoming voice message recalled from said memory means to said play head are all disposed in the cassette-shaped body. A control signal generator, also disposed in the cassette-shaped body and responsive to operation of said cassette player, is provided for detecting a mode of operation of the cassette player and controlling a mode of operation of the voice pager in response thereto. A transmitter, disposed in the cassette-shaped body, is provided for transmitting outgoing voice messages.

13 Claims, 3 Drawing Sheets

WIRELESS VOICE MESSAGING DEVICE FOR USE WITH CASSETTE PLAYER

BACKGROUND OF THE INVENTION

Field of the Invention

This invention relates to a wireless voice messaging device and more particularly to a wireless voice messaging device for receiving voice messages and storing voice messages. The wireless voice messaging device is further designed to fit into a cassette player and play the voice messages back from storage via the cassette player. The wireless voice messaging device can be further adapted as a two-way, wireless voice messaging device for both sending and receiving voice messages.

Wireless voice messaging devices such as pagers for receiving voice messages are well known in the prior art. For example, U.S. Pat. No. 4,965,569 to Bennett et al. describes a paging receiver for receiving analog information having at least one voice message, and includes a memory, a receiving means, a converting means, and a decoder. The receiving means detects the presence of electromagnetic energy representing paging information and applies the information to the converting means. The converting means converts the received information, which is in the form of analog signals, such as real time audio speech signals, to digital information representative of the analog voice information. The digital information is then stored in the memory of the selected receiver. The decoder functions to control the receiving means, to alert the paging user, store, recall and playback voice messages.

In response to user generated inputs, the paging receiver can select a digitized voice message stored in the memory of the receiver and reconvert the digitized voice message to an analog signal via the converting means. The analog signal representative of the original analog voice message is then applied to a so-called support module, which is also controlled by the decoder. The support module supplies the analog signal representative of the original analog voice message to a plurality of annunciation transducers contained in the support module so that it may be reproduced.

As is known by those skilled in the art, minimizing the size and weight of a pager is a critical design criteria. Because of the use of the support module to play the incoming voice messages, the size and weight of the above-described pager is necessarily, and undesirably, increased. Additionally, while the size and weight of the support module is still undesirably large when considering the field of pagers, when considering the size of the speakers or annunciation transducers for purposes of reproducing the voice messages, the size is small and results in a relatively poor quality reproduced voice message.

Furthermore, it would be desirable to provide a two-way voice messaging device. In such devices, it is further required to provide a microphone enabling a user of the device, desiring to send a voice message, to provide the voice message to the memory of the two-way voice messaging device for later transmission by a transmitter. Incorporating such a microphone and accompanying circuitry into existing pagers again requires additional space in the pager thereby adding to its size and weight. As is evident, it would be very desirable to provide a two-way voice messaging device which is capable of high quality sound reproduction.

SUMMARY OF THE INVENTION

The present invention is directed to a wireless voice messaging device for use with a cassette player. In a first embodiment, the wireless voice messaging device includes a receiver for receiving incoming call signals, including at least one received voice message. The receiver is coupled to the cassette player and incoming voice messages are transferrable therebetween. Preferably, an operational state detector in the wireless voice messaging device detects the operational mode of the cassette player, and a control signal is generated in response to the operational mode of the cassette player which is used to control operation of the wireless voice messaging device.

In another embodiment, the wireless voice messaging device is a two-way wireless voice messaging device and includes a receiver for receiving incoming call signals including at least one incoming voice message and a transmitter for transmitting call signals including at least one outgoing voice message. A memory is provided for storing the incoming and outgoing voice messages. The memory is coupled to the cassette player thereby enabling voice messages to be transferred therebetween. Preferably, an operational state detector is provided for detecting an operational mode of the cassette player, and a control signal generator (e.g., a microprocessor) is provided for generating a control signal in response to the mode of operation of the cassette player.

The control signal can in turn be applied to the memory for controlling the operation thereof. For example, the control signal generator, in response to detecting a PLAY mode of operation of the cassette player via the operational state detector, generates a first control signal causing the memory means to recall the received voice message and transfer it to the cassette player. On the other hand, the control signal generator, in response to detecting a RECORD mode of operation of the cassette player via the operational state detector, generates a second control signal causing the memory to store at least one outgoing voice message or voice memo transferred to the memory of the wireless voice messaging device from a cassette player. Such a message can later be transmitted by the transmitter or replayed by the user of the device to perform a scratchpad-type function.

In yet another embodiment, the wireless voice messaging device is a two-way pager including a cassette-shaped body adapted to be inserted into a cassette player in lieu of a cassette. A receiver for receiving incoming call signals including at least one incoming voice message, a memory for storing the incoming voice message and recalling the received voice message in response to a first control signal, and a transducer for establishing an operative connection with a play head of the cassette player for transferring the incoming voice message recalled from the memory to the play head, are all disposed in the cassette-shaped body. Furthermore, a transmitter is also incorporated in the cassette-shaped body for transmitting outgoing call signals including at least one outgoing voice message generated via a microphone connected to or incorporated in the cassette player. Preferably, a control signal generator, also disposed in the cassette-shaped body and responsive to operation of said cassette player, is provided for detecting a mode of operation of the cassette player and controlling a mode of operation of the two-way wireless voice messaging device in response thereto.

BRIEF DESCRIPTION OF THE DRAWINGS

For the purpose of illustrating the invention, there is shown in the drawings, wherein like parts are designated by like reference numerals or characters, an embodiment which is presently preferred, it being understood, however, that the invention is not limited to the precise arrangement and instrumentality shown.

DETAILED DESCRIPTION OF THE PREFERRED EMBODIMENT

In order to best illustrate the utility of the two-way wireless voice messaging device in accord with the present invention, it is described in conjunction with a two-way voice pager capable of receiving, storing and transmitting signals, including voice messages. While the present invention is described hereinafter with particular reference to a two-way pager, it is to be understood at the outset of the description which follows that it is contemplated that the apparatus and methods, in accordance with the present invention, may be used with numerous other communication receiving systems.

Figure 1:
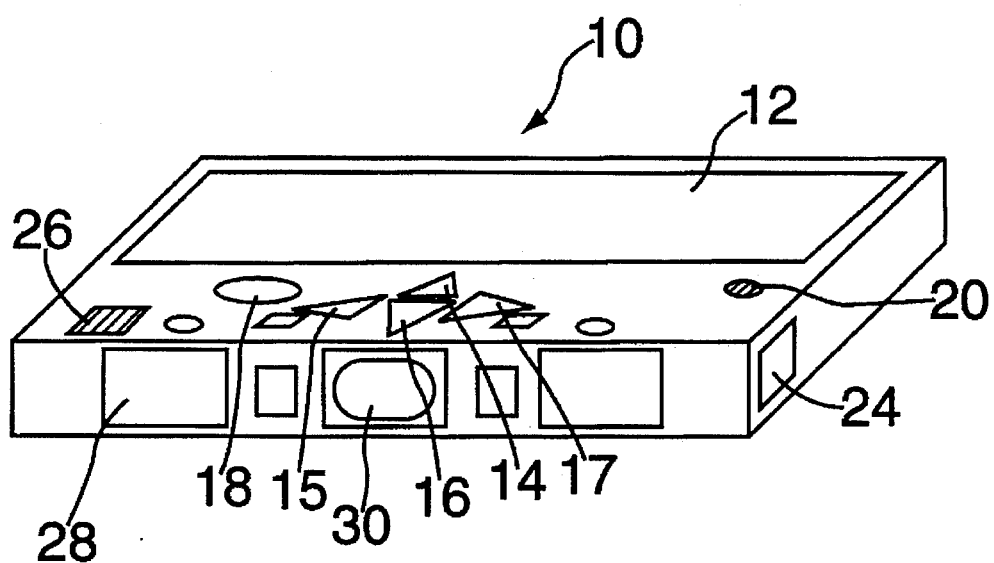
FIG. 1 is a perspective view of a two-way wireless voice messaging device in accord with the present invention.

FIG. 1 is a perspective view of a pager 10 in accord with the present invention. The pager 10 is a two-way voice pager capable of receiving both voice and text messages and transmitting at least voice messages (as described in more detail below, certain functions, such as playing received voice messages require the use of an external cassette player). The pager 10 includes a liquid crystal display (LCD) 12 for displaying text messages received in conventional fashion. An up-arrow key 14 and a down-arrow key 16 are provided for screening through plural voice and text messages. A left-arrow key 15 and a right-arrow key 17 are also provided for selecting, in conventional fashion, various functions the pager 10 is capable of performing. These functions, such as DELETE, are displayed across the bottom of the LCD 12 and are selected via the left and right-arrow keys 15, 17. A selected function can be executed by pressing a function key 18.

A message indicator 20 is also provided for alerting a carrier of the two-way voice pager that an incoming message, voice or text, has in fact been received. The message indicator 20 could be a light emitting diode, a transducer for producing an audible indication that a message has been received, and/or a vibration device for producing a vibration indicative of a received message. A received signal is detected by a main processing unit (see discussion below) in the pager which responds to the received signal to analyze the data and select one of several decoding schemes for appropriately decoding the incoming signals. As with all paging-type devices, the resulting decoded signal is tested for comparison with a designated pager address contained in a code memory. Upon detecting correspondence between the received and decoded signals and the address in the code memory, an output signal is produced indicating to the pager carrier that a message has been received. This could be an output to the message indicator 20 or the LCD 12.

The pager 10 is powered in conventional fashion by a battery 24 and includes a power switch 26. However, the pager 10 further provides a DC power contact 28 for making contact with an alternative supply (alternative to the battery 24) of DC power. As described in more detail below, such an alternative supply could be from a cassette player of the type used to playback and record incoming and outgoing voice messages.

Standing on its own, the pager 10 of the present invention is capable of receiving and displaying text messages and receiving voice messages. However, in order to listen to received voice messages and record outgoing voice messages, the pager 10 must be used in conjunction with a standard cassette player/recorder such as a Walkman® portable stereo. Voice messages are provided to and from such a standard cassette player/recorder via an audio head 30 of the pager 10 as described in more detail below.

Because the pager 10 must be used in conjunction with a standard cassette player/recorder, the pager 10 is designed to be of the same dimensions as a typical audio cassette. However, as is known, typical cassettes have reel hubs which are designed to engage with upstanding drive portions of a cassette player in order to drive the cassette. These reel hubs result in holes through the entire cassette. Since such holes would result in holes through the LCD 12 if LCD 12 was the width of the entire cassette face, the LCD 12 is preferably only the width of the label portion of a typical audio cassette (although FIG. 1 shows the LCD 12 as somewhat larger).

Alternatively, by providing a customized cassette player/recorder, e.g., one with reduced-height upstanding drive portions, the LCD could be made the width of the entire cassette face as reel hubs through the entire cassette would not be required. Finally, if a larger LCD is required, it could be contoured to the reel hubs, or if no LCD is required for a particular application, it could be eliminated entirely.

Figure 2:
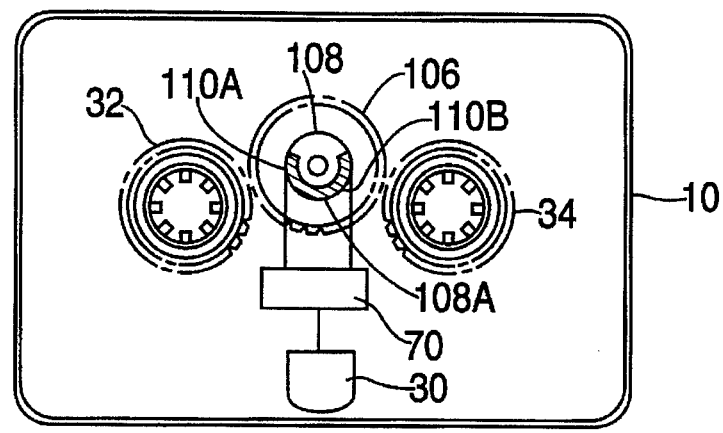
FIG. 2 is a schematic plan view of the bottom side of the two-way wireless voice messaging device in FIG. 1.

In this regard, FIG. 2 depicts a schematic plan view of the bottom side of the pager 10 of FIG. 1. The pager 10 is provided with reel hubs 32 and 34 passing completely through the pager 10, and therefore the LCD 12 (FIG. 1) is positioned on the top side of the pager where a label would be positioned on a conventional audio cassette.

As will be described in more detail below, the reel hubs 32 and 34 act in conjunction with other aspects of the pager to detect an operating state of the cassette player and generate a control signal to control the pager 10 in synchronism with the operation of cassette player.

Figure 3:
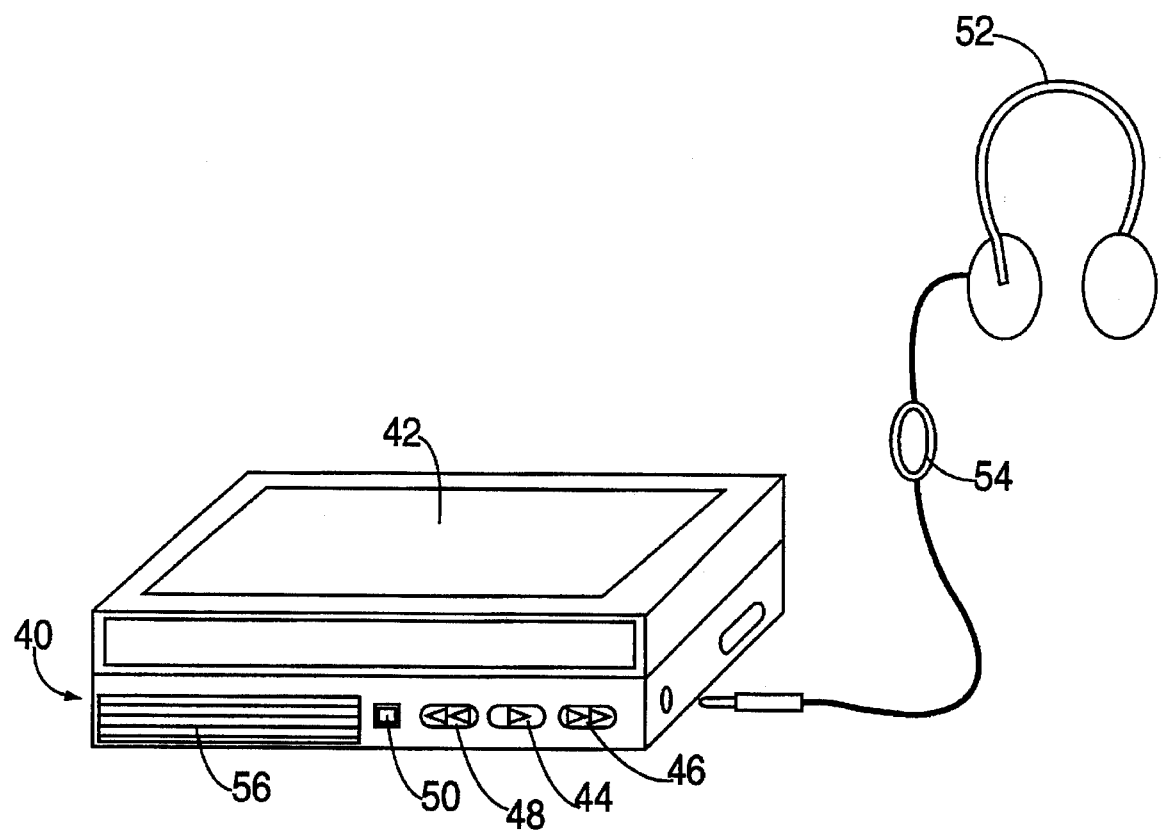
FIG. 3 is a perspective view of a standard portable cassette player/recorder with the two-way wireless voice messaging device of FIG. 1 contained therein.

FIG. 3 shows a standard portable cassette player/recorder 40 having the pager 10 of FIG. 1 positioned inside in the same fashion as a conventional audio cassette would be placed inside the cassette player/recorder 40. Audio head 30 of the pager 10 (FIG. 1) is designed to be appropriately aligned with the record and playback heads (not shown in FIG. 3) of the cassette player/recorder 40 so that information signals may be transferred between the two. The details of the heads and the transfer are well within the purview of one of ordinary skill in the art and are shown, e.g., in U.S. Pat. No. 4,734,897, the disclosure of which is expressly incorporated herein by reference thereto. Advantageously, the cassette player/recorder 40 has a see-through window 42 allowing a user of the pager to view the LCD 12 (FIG. 1) when the pager 10 is positioned inside the player/recorder 40. The player/recorder 40 includes a standard PLAY button 44, FAST FORWARD button 46, REWIND button 48 and RECORD button 50. Operation of these buttons on the player/recorder 40 results in a corresponding operation of the pager 10.

Specifically, pressing PLAY button 44 causes the pager 10 to replay voice messages by transmitting voice messages stored in the memory of the pager 10 to a speaker (not shown in FIG. 3) of the player/recorder 40, via the audio head 30 (FIG. 1) of the pager 10 and the playback head of the player/recorder 40. As a result, the voice messages may be monitored by a user of the pager 10. Alternatively, headphones 52 may be provided for allowing the user to privately monitor his or her messages. Pressing the FAST FORWARD button 46 allows a user to skip-ahead to the next stored voice message (if there is a next message), while pressing the REWIND button 48 allows a user to skip-back to the previous message (if there is a previous message). Furthermore, by pressing the RECORD button 50 to initiate recording (this may entail pressing the RECORD button 50 in combination with the PLAY button 44 depending on the player/recorder), the user can record voice messages to the pager 10. The voice messages to be recorded are transmitted from a microphone 54 attached to the headphone wire (or incorporated in the cassette player itself), to a record head of the player/recorder 40, and to the audio head 30 (FIG. 1) of the pager 10. As described in more detail below, the voice message is then digitally recorded via a speech encoder such that it is transmittable by the pager 10 as if ordinary data. The recorded voice message can be later transmitted by the pager 10. Alternatively, the voice message need not be transmitted but can be played-back by the user of the pager. In such a way, the pager can serve as a so-called scratchpad or note pad for the user.

Preferably, but not necessarily, when the pager 10 is placed in the player/recorder 40, the pager 10 is powered by a battery 56 of the player/recorder 40 via DC power contact 28 (FIG. 1) so as to conserve pager battery power. In such a case, however, the player/recorder 40 would need to be specially designed to have a power contact of its own to contact DC power contact 28.

Figure 4:
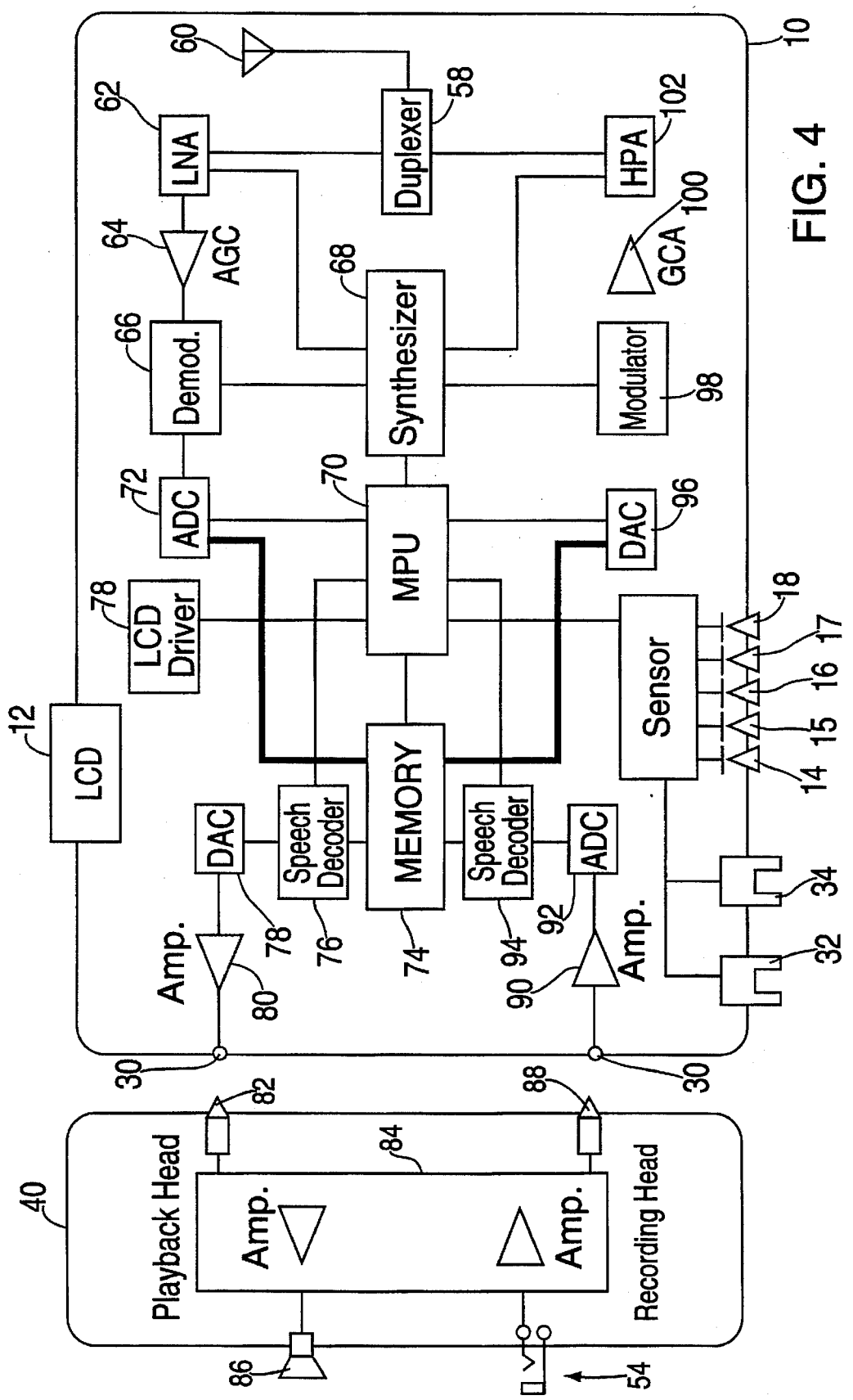
FIG. 4 is a block diagram of the internal components of the two-way wireless voice messaging device in FIG. 1.

FIG. 4 is a block diagram of the internal components applicable to the preferred embodiment of the present invention. The pager 10 includes a duplexer 58 for receiving incoming call signals including at least one incoming voice message from an antenna 60 and transmitting outgoing call signals including at least one outgoing voice message to the antenna 60.

Specifically, incoming call signals, including the voice messages, are received by the duplexer 58 via the antenna 60, amplified by low noise amplifier (LNA) 62, subject to automatic gain control via amplifier 64 and then demodulated by demodulator 66. The output of the demodulator 66 is an intermediate frequency (IF) signal. Both the LNA 62 and the demodulator 66 function to down-convert the received signal in response to respective waveforms generated by a synthesizer 68 under the control of a main processing unit (MPU) 70. The demodulated IF signal is next digitized (converted to a stream of binary bits) by analog to digital converter 72 under control of MPU 70 and a digital representation of the received signal is stored in a memory device 74. At this point, the MPU 70 is designed to look for a predetermined flag in the stream of binary data bits to determine if text or voice data is present in the received data. If the MPU 70 determines that the received message is text based, this data can immediately be sent to liquid crystal display (LCD) 12 via an LCD driver 78 under the control of the MPU 70. The MPU 70 could likewise activate the message indicator (not shown in FIG. 4, 20 of FIG. 1). On the other hand, if the received message is determined to be voice or speech based, the user of the pager can simply be informed of this via message indicator light 20 (FIG. 1) or LCD 12.

When the user later decides to recall this voice data in a fashion described below, a speech decoder 76, also operating under control of the MPU 70, decodes the digitized data according to the same algorithm as it was encoded by the transmitting terminal and provides a meaningful file that can be listened to by a user. This algorithm could include adaptive pulse code modulation (ADPCM) or a proprietary coding scheme.

More specifically, if a user of the voice pager desires to later retrieve and playback the voice message stored in memory 74, the voice pager 10 must first be placed in a standard cassette player/recorder 40 such as described above in connection with FIG. 3. The user then presses the PLAY button 44 (FIG. 3) on the cassette player/recorder 40. The MPU 70 senses operation of the PLAY button 44 via reel hubs 32 and 34 and associated circuitry as described in more detail below, and causes the first voice message stored in memory 74 to be decoded by the speech decoder 76. The decoded voice message from the speech decoder 76 is converted to an analog signal by digital to analog converter 78, amplified by amplifier 80 and applied to the audio head 30 of the pager 10. A playback head 82 of the cassette player/recorder 40 receives this analog signal, amplifies the same via amplifier 84 and transmits it to a speaker 86 so that it may be heard by a user of the cassette player/recorder 40. The speaker 86 may be the headphone set 52 of FIG. 3.

By operating other buttons (FIG. 3) of cassette player 40, additional functions may be performed. For instance, if the FAST FORWARD button 46 (FIG. 3) is depressed, MPU 70 will sense the same and instruct memory 74 to skip ahead to the next voice message in memory if such a message exists. Analogously, if the REWIND button 48 (FIG. 3) is depressed, MPU 70 will sense the same and instruct memory 74 to skip back to the previous voice message in memory if such a message exists.

Furthermore, if the RECORD button 50 (FIG. 3) is depressed, MPU 70 will sense the same and provide for the transfer of an outgoing voice message, dictated by a user speaking into microphone 54, to the amplifier 84 of the cassette player/recorder 40. Next, the message will be transferred to a record head 88 of the cassette player/recorder 40, where it will be applied to the audio head 30 of pager 10. From the audio head 30, the outgoing message is amplified by an amplifier 90, digitized by an analog to digital converter 92, encoded by a speed encoder 94 under control of MPU 70 and stored in memory 74 for later transmission or playback. The speech encoder 94 encodes the data in accord with a particular algorithm which could be ADPCM or a proprietary coding scheme. The encoded data could later be played-back as if it was a received message (thereby allowing the pager to function as a notepad for its user) or sent to a remote terminal.

When a user desires to send a message stored in memory 74, the pager 10 is extracted from the cassette player and a user selects a destination for the message to be transmitted. A user can select a destination from an address list, which he or she has previously stored in the pager 10, using the up/down arrow key 14, 16. If the destination is not stored in advance, a user can set such an address manually using the left and right arrow keys 15, 17 to select the appropriate number of the destination (individual numbers being displayed across the bottom of the LCD 12). After completion of the above-described addressing procedure, a user presses the function key 18 (FIG. 1) to transmit the voice message in accord with the protocol of the pager 10. The encoded message is recalled from memory 74 and converted to an analog IF signal by digital to analog converter 96 under the control of the MPU 70. The IF signal is then modulated by a modulator 98, amplified in conventional fashion by gain control amplifier 100 and high power amplifier 102, and transmitted by the duplexer 58 via antenna 60. Each of these steps is also under the control of MPU 70.

If the cassette player/recorder 40 is custom designed to include a TRANSMIT button, and the pager 10 designed to sense operation of the same, the pager 10 can be left in the cassette player 40 when transmitting voice messages. In such a way, the battery 56 (FIG. 3) of the cassette player/recorder 40 can be used to power the transmit operation. Furthermore, as an alternative to custom designing the player/recorder 40, the pager 10 could be made to sense operation of a unique combination of buttons on a standard player/recorder indicative of a transmit operation.

With regard to the details concerning how the pager 10 senses operation of the cassette player/recorder 40, as described above in connection with FIG. 2, reel hubs 32 and 34 of the pager 10 function to sense an operating state of the cassette player/recorder 40 (not shown in FIG. 2). MPU 70 detects the operating state and generates a control signal to control the pager 10 in synchronism with the operation of cassette player/recorder 40.

Specifically, on the circumference of reel hubs 32 and 34 gear teeth are formed. A gear 106 is positioned between the hubs 32 and 34. The hubs 32 and 34 are arranged to be in constant drive connection with each other through this gear 106. A non-conductive rotation detector plate 108, which is smaller in diameter than the gear 106, is mounted coaxially on the gear 106. Electrically conductive leaf spring-like slider plates 110A and 110B are disposed so as to slightly engage the circumferential surface of the rotation detector plate 108.

An arcuate electrode plate 108A is provided on a circumference of the rotation detector plate 108. When both of the slider plates 110A and 110B slidingly contact the electrode plate 108A, a closed circuit is formed. However, when only one of the slider plates make contact with the electrode plate 108A, an open circuit is formed. These open and closed circuit conditions are sensed by the MPU 70 which in turn makes a decision concerning a mode of operation of the cassette player/recorder 40 based thereon. For instance, a continuous sequence of open and closed circuits at predetermined intervals will be interpreted as a PLAY operation. A continuous sequence of open and closed circuits at faster than the predetermined interval will be interpreted as a FAST FORWARD operation. A RECORD operation would be detected by sensing a continuous sequence of open and closed circuits at the predetermined interval plus an input at the audio head 30.

Furthermore, by mounting a second rotation detector plate (not shown) on the gear 106 and positioning a second arcuate electrode (not shown) on that detector plate ninety degrees out of phase from the arcuate electrode 108A, a second sequence of open and closed circuits can be provided to the MPU 70 via a second set of slider plates (not shown). Because the two sequences will be ninety degrees out of phase (quadrature modulated), the direction of rotation of the hubs 32 and 34 can be detected and operations such as REWIND can be distinguished from FAST FORWARD.

It should be understood that many options for detecting operation of the cassette player/recorder 40 would be clear to one of ordinary skill in the art and the present invention is not limited to the specific embodiment described herein.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

I claim:

1. A wireless voice messaging device for use with a cassette player, comprising:
   a receiver for receiving incoming call signals including at least one incoming voice message;
   coupling means for coupling said receiver with said cassette player and for transferring said at least one incoming voice message therebetween;
   operation detecting means for detecting an operational mode of the cassette player; and
   control signal generating means for generating a control signal in response to the operational mode of the cassette player, said control signal being used to control operation of said wireless voice messaging device.

2. A wireless voice messaging device for use with a cassette player, comprising:
   a receiver for receiving incoming call signals including at least one incoming voice message;
   a memory for storing said at least one incoming voice message;
   coupling means for coupling said memory means with said cassette player and for transferring said at least one incoming voice message therebetween;
   operation detecting means for detecting a mode of operation of the cassette player; and
   control signal generating means for generating a control signal in response to the mode of operation of the cassette player, said control signal being applied to said memory for controlling the operation thereof.

3. The wireless voice messaging device of claim 2, wherein the control signal generating means, in response to detecting a PLAY mode of operation of the cassette player, generates a first control signal causing said memory means to recall said at least one incoming voice message and transfer said at least one incoming voice message to said cassette player through said coupling means.

4. The wireless voice messaging device of claim 3, wherein the control signal generating means, in response to detecting a RECORD mode of operation of the cassette player, generates a second control signal causing said memory to store at least one outgoing voice message transferred to said memory from said cassette player through said coupling means.

5. The wireless voice messaging device of claim 2 further comprising:
   a transmitter for transmitting at least one outgoing voice message.

6. A wireless voice messaging device comprising:
   a cassette-shaped body adapted to be inserted into a cassette player in lieu of a cassette;
   receiving means, disposed in said cassette shaped body, for receiving incoming call signals including at least one incoming voice message;
   memory means, disposed in said cassette-shaped body, for storing said at least one incoming voice message and recalling said at least one incoming voice message in response to a first control signal;
   transducer means, disposed in said cassette-shaped body, for establishing an operative connection with a play head of the cassette player for transferring said at least one incoming voice message recalled from said memory means to said play head; and control signal generating means, disposed in said cassette-shaped body and responsive to operation of said cassette player, for detecting a mode of operation of the cassette player and controlling a mode of operation of the wireless voice messaging device in response thereto.

7. The wireless voice messaging device according to claim 6, further comprising:

transmitting means, disposed in said cassette shaped body, for transmitting outgoing call signals including at least one voice message.

8. The wireless voice messaging device according to claim 6, wherein the control signal generating means, in response to detecting a PLAY mode of operation of the cassette player, generates the first control signal.

9. The wireless voice messaging device according to claim 8, wherein, in response to a second control signal, the transducer means is further adapted to transfer at least one outgoing voice messages, generated via a microphone of the cassette player, from a record head of the cassette player to said memory means.

10. The wireless voice messaging device according to claim 9, wherein the control signal generating means, in response to detecting a RECORD mode of operation of the cassette player, generates the second control signal.

11. The wireless voice messaging device according to claim 10, further comprising:

transmitting means, disposed in said cassette shaped body, for transmitting outgoing call signals including said at least one outgoing voice message.

12. The wireless voice messaging device according to claim 6, further comprising a liquid crystal display, disposed in said cassette-shaped body, and wherein the incoming call signals include at least one incoming text message to be displayed on said liquid crystal display.

13. A two-way voice pager comprising:

a cassette-shaped body adapted to be inserted into a cassette player in lieu of a cassette;

receiving means, disposed in said cassette shaped body, for receiving incoming call signals including at least one incoming voice message;

memory means, disposed in said cassette-shaped body, for storing said at least one incoming voice message and recalling said at least one incoming voice message in response to a first control signal;

connection means, disposed in said cassette-shaped body, for establishing an operative connection with a play head of the cassette player for transferring said at least one incoming voice message recalled from said memory means to said play head;

control signal generating means, disposed in said cassette-shaped body and responsive to operation of said cassette player, for detecting a mode of operation of the cassette player and controlling a mode of operation of the two-way voice pager in response thereto by generating corresponding control signals; and transmitter means, disposed in said cassette-shaped body, for transmitting outgoing call signals, including at least one outgoing voice message, in response to a second control signal, said at least one outgoing voice message transferred from said cassette player to said memory means via said connection means.

* * * * *